United States Patent
Duncan et al.

(10) Patent No.: US 9,714,494 B2
(45) Date of Patent: *Jul. 25, 2017

(54) SYSTEMS AND METHODS FOR DEICING

(71) Applicant: Elwha LLC, Bellevue, WA (US)

(72) Inventors: Willam D. Duncan, Mill Creek, WA (US); Peter L. Hagelstein, Carlisle, MA (US); Roderick A. Hyde, Redmond, WA (US); Muriel Y. Ishikawa, Livermore, CA (US); Jordin T. Kare, San Jose, CA (US); David B. Tuckerman, Lafayette, CA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,925

(22) Filed: Apr. 30, 2015

(65) Prior Publication Data

US 2015/0233070 A1 Aug. 20, 2015

Related U.S. Application Data

(63) Continuation of application No. 13/802,242, filed on Mar. 13, 2013.

(51) Int. Cl.
*H05B 3/84* (2006.01)
*E01H 5/10* (2006.01)

(52) U.S. Cl.
CPC .............. *E01H 5/10* (2013.01); *E01H 5/106* (2013.01)

(58) Field of Classification Search
CPC ... H05B 1/02; H05B 3/02; H05B 3/84; H05B 3/00; B64D 15/12; B64D 15/14; B64D 15/16; B64D 15/163; B64D 15/20; B64D 15/22

See application file for complete search history.

(56) References Cited

U.S. PATENT DOCUMENTS

| | | | |
|---|---|---|---|
| 4,900,891 A * | 2/1990 | Vega et al. | ............... 219/121.6 |
| 5,029,440 A | 7/1991 | Graber et al. | |
| 5,172,024 A | 12/1992 | Broussoux et al. | |
| 5,206,806 A | 4/1993 | Gerardi et al. | |
| 5,921,502 A | 7/1999 | Al-Khalil et al. | |
| 6,237,874 B1 | 5/2001 | Rutherford et al. | |
| 6,330,986 B1 | 12/2001 | Rutherford et al. | |
| 6,576,115 B2 | 6/2003 | Petrenko | |
| 6,870,139 B2 | 3/2005 | Petrenko | |

(Continued)

FOREIGN PATENT DOCUMENTS

KR 20090024171 3/2009

OTHER PUBLICATIONS

PCT International Search Report; International App. No. PCT/US2014/023356; Aug. 12, 2014; 8 pages.

*Primary Examiner* — Brian Jennison
(74) *Attorney, Agent, or Firm* — Foley & Lardner LLP

(57) ABSTRACT

A deicing method includes the steps of determining a necessary quantity of heat to substantially vaporize an interfacial layer between a solid surface and a layer of ice and applying pulsed heating at the interfacial layer. The pulsed heating is applied with the determined necessary quantity of heat to substantially vaporize the interfacial layer.

35 Claims, 11 Drawing Sheets

(56) References Cited

U.S. PATENT DOCUMENTS

| | | | |
|---|---|---|---|
| 7,034,257 | B2 | 4/2006 | Petrenko |
| 7,246,773 | B2 | 7/2007 | Stoner et al. |
| 2004/0149734 | A1 | 8/2004 | Petrenko et al. |
| 2005/0035110 | A1* | 2/2005 | Petrenko ....................... 219/482 |
| 2006/0272340 | A1 | 12/2006 | Petrenko |
| 2007/0079627 | A1 | 4/2007 | Broadbent et al. |
| 2007/0101752 | A1 | 5/2007 | Broadbent et al. |
| 2007/0101753 | A1 | 5/2007 | Broadbent |
| 2007/0170312 | A1 | 7/2007 | Al-Khalil |
| 2008/0186429 | A1 | 8/2008 | Hamamatsu et al. |
| 2009/0199569 | A1 | 8/2009 | Petrenko |
| 2010/0084389 | A1 | 4/2010 | Petrenko |
| 2010/0206990 | A1* | 8/2010 | Petrenko ................... 244/134 D |
| 2011/0259880 | A1 | 10/2011 | Petrenko et al. |

* cited by examiner

SYSTEMS AND METHODS FOR DEICING

CROSS-REFERENCE TO RELATED PATENT APPLICATIONS

This application is a continuation of U.S. patent application Ser. No. 13/802,242, filed Mar. 13, 2013, which is incorporated herein by reference in its entirety.

BACKGROUND

Accumulation of ice onto or near solid parts can cause various problems in a wide variety of situations. For example, accumulation of ice on exterior surfaces of an airplane in flight can increase the weight and drag of those surfaces, endangering the safety of a flight. As another example, accumulated ice in a fuel line can become lodged against the solid walls of the line, blocking flow of fuel. As yet another example, accumulation of ice on a roadway can increase the chances of automobile accidents by reducing the friction of the roadway. Many other examples are possible.

Current methods of removing ice include mechanical scraping, adding chemical solutes, and continuous heating. Continuous heating involves applying heat uniformly and consistently to the ice to melt all of the ice into liquid.

SUMMARY

In one embodiment, a method for removing ice from a solid surface involves determining a quantity of heat that is needed to substantially vaporize an interfacial layer between the ice and the solid surface. The method also involves applying pulsed heating at the interfacial layer with the determined quantity of heat needed to substantially vaporize the interfacial layer.

In another embodiment, a deicing apparatus is operable to remove a layer of ice from a solid surface. Such an apparatus includes control circuitry to determine a necessary quantity of heat to vaporize an interfacial layer between the solid surface and the layer of ice. The apparatus also includes a pulsed heating system configured to apply pulsed heating at the interfacial layer with the determined necessary quantity of heat to substantially vaporize the interfacial layer.

In yet another embodiment, a control system is operable to control the removal of ice from a solid surface. The control system includes control circuitry operable to determine a necessary quantity of heat to vaporize an interfacial layer between the solid surface and the ice. The control system also includes a heating system interface communicatively coupling the control system to a heating system. The heating system is configured to apply pulsed heating at the interfacial layer with the determined necessary quantity of heat to substantially vaporize the interfacial layer.

In a further embodiment, an ice detection system includes sensors for detecting ice on a solid surface. Control circuitry is operable to determine a quantity of heat needed to substantially vaporize an interfacial layer between the solid surface and the detected ice. The ice detection system further includes a heating system interface coupling the ice detection system to a heating system. The heating system is configured to apply pulsed heating at the interfacial layer with the determined necessary quantity of heat to substantially vaporize the interfacial layer.

In still another embodiment, a deicing method involves detecting a layer of ice on a solid surface and using pulsed heating to vaporize an interfacial layer between the ice and the surface.

In a further embodiment, a deicing method involves determining a necessary quantity of heat to substantially vaporize an interfacial layer between a solid surface and a layer of ice; and causing pulsed heating to be applied at the interfacial layer, wherein the pulsed heating is applied with the determined necessary quantity of heat to substantially vaporize the interfacial layer.

The foregoing is a summary of the disclosure and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

DETAILED DESCRIPTION

Disclosed herein are systems and methods that facilitate removal of ice from a solid surface through vaporization of an interfacial layer between the surface and the ice. An example system may include pulsed heating applied at the interfacial layer. Such pulsed heating may help to concentrate the majority of the applied heat onto the interfacial layer, rather than allowing the heat to spread throughout the layer of ice. The system may apply sufficient heat to vaporize, or mostly vaporize, the interfacial layer. Other elements or systems may also help to remove the ice.

The following section discusses features of example devices and systems. The subsequent section discusses methods of use for deicing systems and devices. Although the section regarding example methods makes reference to elements described in the section regarding the example systems, this is not intended to imply that the example systems and methods must be used together. Rather, the example methods may be carried out using any suitable system or combination of systems. Also, procedures other than those outlined in the example methods may be carried out using the described example systems.

I. Example System and Surface Configuration

Figure 1:
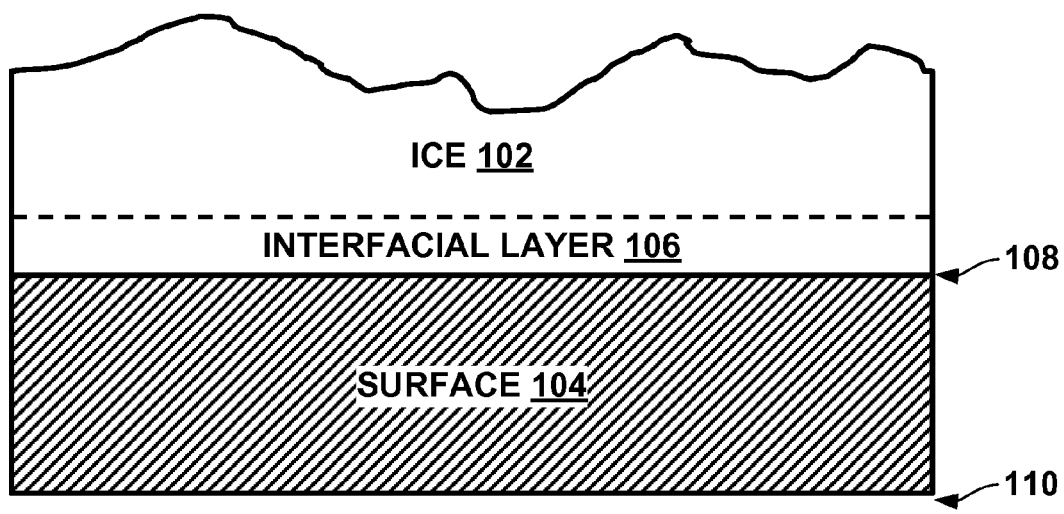
FIG. 1 is a diagram of an example situation in which present embodiments may be used.

FIG. 1 illustrates an example situation in which the present embodiments may be used. As shown, a layer of ice 102 is in direct contact with a solid surface 104. An interfacial layer 106 is defined around the interface 108 between ice 102 and surface 104. Although solid surface 104 is shown as one continuous body, it may include any number of layers, cavities, and/or inclusions. Additionally, interfacial layer 106 may be the same material as ice 102 or a different layer. If interfacial layer 106 is the same material as ice 102, the system may treat a particular thickness of the ice to be interfacial layer 106. As will be shown, an example deicer may vaporize interfacial layer 106, separating ice 102 from solid surface 104. When such a separation is achieved, ice 102 may become more easy to remove from surface 104. In some situations pressure from the vaporization of interfacial layer 106 may be sufficient to remove ice 102 from the surface. In other situations, forces from the external environment (such as those due to gravity, wind, air pressure, etc.) may aid in removing ice 102 when the interface layer 106 has been vaporized.

Figure 2:
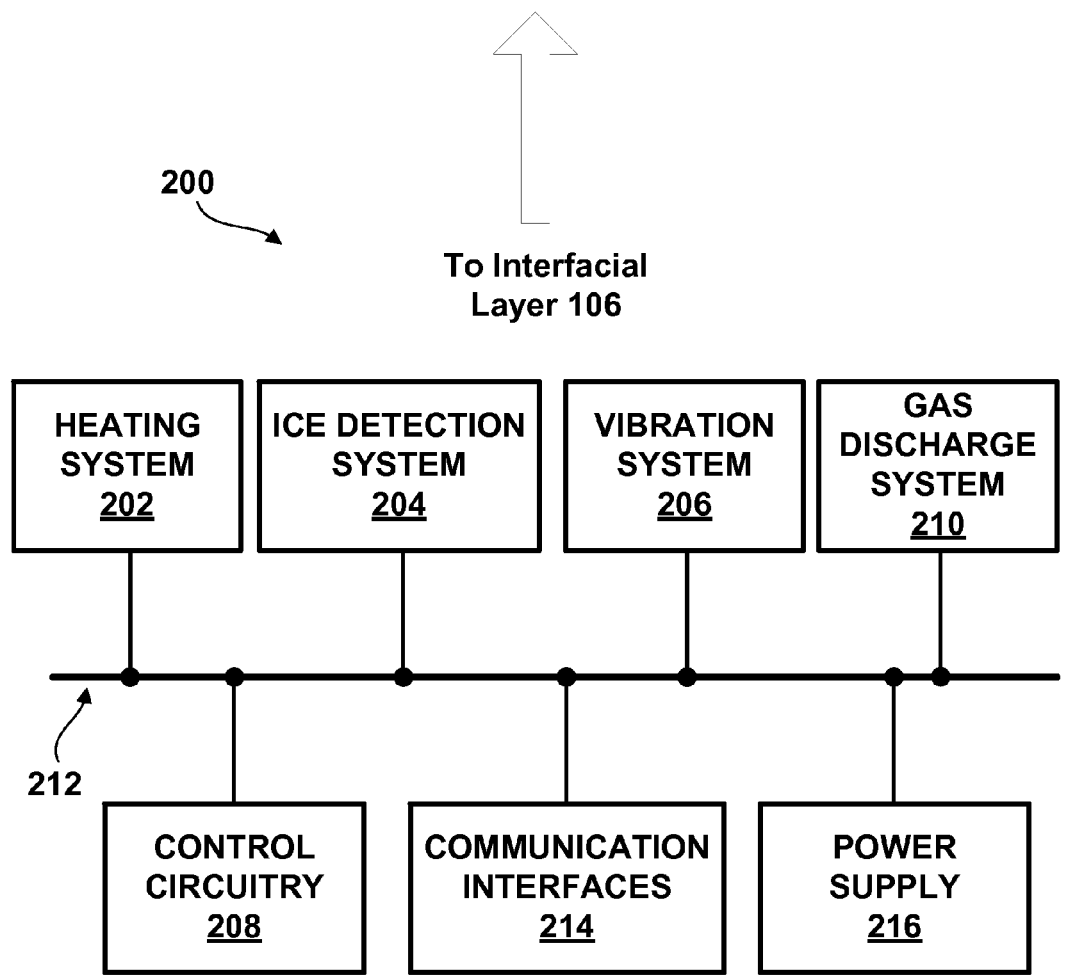
FIG. 2 is a schematic diagram illustrating elements of a system according to an exemplary embodiment.

FIG. 2 shows an example deicer 200 that includes a heating system 202, an ice detection system 204, a vibration system 206, control circuitry 208, and a gas-discharge system 210 all contacted by a system bus 212 to a power supply 216. In some cases, elements of deicer 200 may be integrated into solid surface 104. In other embodiments, deicer 200 may be separably connected to surface 104. Deicer 200 may also be affixed near, but not connected, to surface 104.

A. Heating System

Heating system 202 may include a variety of heat producing and transferring elements. An example heating system may provide pulsed heating; that is, heating that is not continuously turned to the same level. Therefore, heating system 202 may be operable to be turned on and off. In some embodiments, individual heating elements may be configured to turn off independently of the system as a whole. In other embodiments, all the heating elements may be jointly controlled to turn on and off, either sequentially or simultaneously. Additionally, the amount of heat that is applied from each heating element may be controlled individually or jointly. In some cases, the on/off capability and the amount of heat adjustments may be controlled by the same system.

In some cases, heating elements may transfer thermal energy into interfacial layer 106 through heat conduction from surface 104 or elements on surface 104. For example, a resistive heater affixed to side 110 of surface 104 may transfer heat to surface 104, which, in turn, may transfer heat across interface 108 into interfacial layer 106. As another example, a heating element may be placed at interface 108 between ice 102 and surface 104, so that heat from the heating element may directly conduct into interfacial layer 106. In yet another example, heat-exchangers may be disposed through surface 104 to carry energy from a central heating element to interface 108.

In other cases, heating elements may generate heat within interfacial layer 106 through electrical conduction. For example, heating system 202 may include elements that apply an electrical potential across areas of interfacial layer 106, producing an electrical current to flow through interfacial layer 106, heating this layer. In such an implementation, surface 104 may be less conductive, or coated in an insulating material to avoid leakage of current out of interfacial layer 106. Then, the electrical potential may be applied at or near interface 108, so that the majority of the current flows through interfacial layer 106 rather than through the remainder of ice 102.

As another example, heating system 202 may generate heat within interfacial layer 106 through electromagnetic induction. In particular, heating system 202 may generate a varying magnetic field passing through interfacial layer 106. Such a field may induce electrical current (and therefore heat) in the conductive ice of interfacial layer 106. If surface 104 is conductive, the magnetic field may also produce heating electrical currents in surface 104, so that interfacial layer 106 is heated by thermal conduction from surface 104 as well.

Figure 3A:
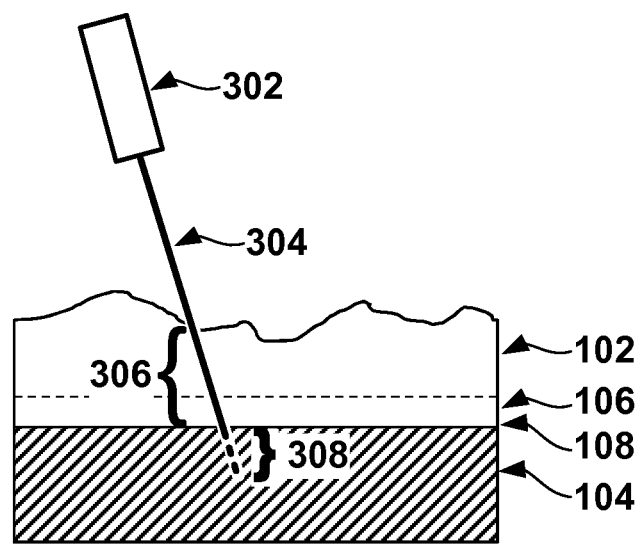
FIG. 3A-3B are diagrams illustrating the use of two example heating systems.
Figure 3B:
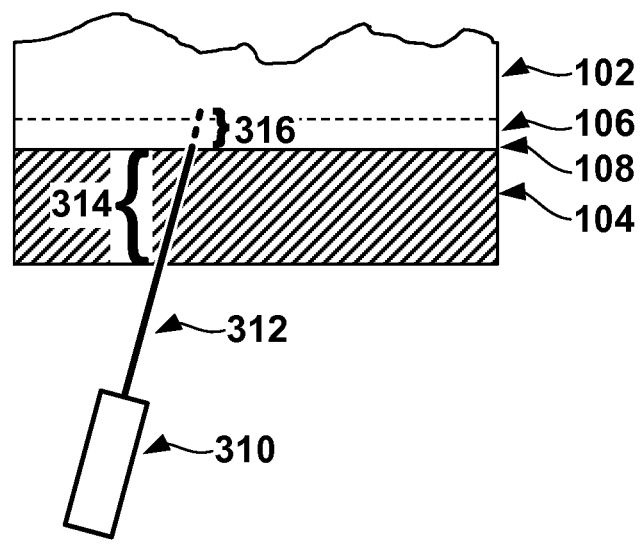

As another example, heating system 202 may include one or more light sources that emit light that is absorbable by the materials around interface 108. When this light is absorbed, the energy of the light is released as heat into interfacial layer 106. As shown in FIGS. 3A and 3B, light sources (or waveguides from light sources) may be mounted on the outside (above ice 102) or the inside (below side 110) in order to provide absorbable light. In FIG. 3A, light source 302 emits a light beam 304 from the outside into ice 102, interfacial layer 106, and surface 104. In the exemplary embodiment of FIG. 3A, the frequency of light beam 304 may be such that light beam 304 is not readily absorbable by ice 102 and interfacial layer 106, but is strongly absorbable by the material of surface 104. Low absorbability in water-based ice, for example, may be accomplished by using light with a central wavelength in the range of 0.3-0.5 µm, although other frequency ranges are possible. High absorbability in surface 104 may be accomplished by selecting a light wavelength for which the material of surface 104 has a high absorbability. Such a wavelength may be determined from direct testing and measurement of the surface or by referring to an appropriate atlas of absorption spectra. When an appropriate wavelength is selected, light beam 304 may pass through ice 102 and interfacial layer 106 (as shown by segment 306) without losing very much power and, then, penetrate only a short distance 308 into surface 104 before being absorbed. The heat generated from this absorbed light may then transfer from surface 104 into interfacial layer 106, substantially vaporizing layer 106.

In FIG. 3B, light source 310 emits a light beam 312 from the inside into surface 104, and interfacial layer 106. In the exemplary embodiment of FIG. 3A, the frequency of light beam 312 may be such that light beam 312 is not readily absorbable by the material of surface 104, but is strongly absorbable by ice 102 and interfacial layer 106. Choosing a main or central frequency of the emitted light may depend strongly on the type of surface material, ice composition, and ice impurities. To make the light absorbable by water-based ice, for example, a main frequency of the light may have a wavelength in one of the ranges 0.01-0.1 µm, 2.8-150 µm, or 150-10,000 µm, among other possible emission spectra. To make the light less absorbable to a glass surface, as another example, the main frequency may be chosen in the range from 0.1-4 µm. Other absorption properties may again be determined by experiment or reference to an absorption atlas. When an appropriate wavelength is selected, light beam 312 may pass through surface 104 (as shown by segment 314) without losing very much power and, then, penetrate only a short distance 316 into interfacial layer 106 and ice 102 before being absorbed. In particular, interfacial layer 106 may absorb the majority of light beam 312, so that heating from light beam 312 is focused within interfacial layer 106.

Although the foregoing examples show single beams of light, example light sources may emit multiple beams of light or a diffuse illumination pattern rather than a beam of light. Any type of light source may be used for heating illumination. Sources that produce spatially or spectrally coherent light (e.g., laser sources, gas-discharge lights, fluorescent sources, etc.) may be useful in controlling the heating location or material selectivity of heating. A variety of optical elements (e.g., lenses, mirrors, beam-splitters, liquid crystals, baffles, filters, polarizers, deflectors, and/or waveguides.) may also be used to alter and control emitted light.

In other cases, heating system 202 may include sources that generate heat by mechanical movement or vibration. For example, compression heating (also called "adiabatic heating") produces heat by mechanically compressing a fluid in a fixed-volume container to thermodynamically increase temperature of the compressed fluid and then conducting heat away from the fluid. As another example, a thermoacoustic heat pump converts high-intensity sound waves into heat by circulating fluids between high and low pressure regions of the sound wave so that the fluids are repeatedly heated and cooled by adiabatic compression and expansion. As another example, vibration energy can be directly absorbed within interfacial layer 106.

Some embodiments may use a combination of heating sources. For example, a system may use two types of heat sources simultaneously to provide the necessary thermal energy to vaporize interfacial layer 106. As another example, a system may use one type of heat source to melt interfacial layer 106 into liquid and a second heating source to vaporize the produced liquid. As a further example, a system may use one source to vaporize interfacial layer 106 and a second source to heat surface 104, to prevent refreezing.

In some embodiments, a system may include heat transferring elements to communicate thermal energy from central heat sources to heating points along surface 104. In some cases, heat transferring elements may simple lines of thermally conductive material from a heat source to a heating location. In other cases, heat exchangers may physically transport heated material from source to surface location.

Surface 104 may include multiple heating locations arranged across its area. For example, heating elements may be disposed in surface 104 at locations along the length of interface 108. In this way, each portion of interfacial layer 106 may receive heat from a nearby heating location. As discussed above, a heating location may be the site of a heating source or the site to which heat is transferred from a heat or light source. For a two-dimensional surface, the heating locations may be arranged in a pattern over the surface. In some cases, discrete heating locations may be uniformly distributed across surface 104 so that any portion of interfacial layer 106 may be heated from a nearby heating location. In other cases, heating locations may represent coverage areas rather than discrete heating points. For example, heat from heat sources that are placed on interface 110 may spread out while transporting through surface 104 to interface 108. Such spreading may produce continuous portions of interfacial layer 106 that receive heat from a single source. In still other cases, heating locations may be placed only at specific portions on surface 104. For example, heating locations may be placed in lines across surface 104 so that corresponding lines of interfacial layer 106 may be vaporized in the expectation that such vaporization could produce fault-lines in ice 102. In further cases, heating locations may be dynamically adjustable. For example, light source 300 may be mounted to a movable support so that a system may control the location(s) that light source 300 heats by changing the direction that light source 300 faces. As another example, an active deflection system may be used to control the direction that light travels after it leaves a fixed-direction (i.e., not movable) light source. As a further example, heat sources may be mounted onto movable structures, so that the heat sources may be moved to dynamically change the heating locations. Other examples are possible.

B. Ice Detection System

In some embodiments, deicer 200 may include a device or system, such as ice detection system 204, for detecting the presence and properties of ice 102. An ice detection system may include any of various apparatus for detecting the presence of ice 102 on surface 104.

For example, ice detection system 204 may include one or more mechanical vibrators for exciting acoustic waves along surface 104 and one or more acoustic sensors for measuring the resulting waves. In such an embodiment, the system may be configured to detect the presence of the ice by sending well-defined mechanical vibrations across surface 104 and comparing resulting waves at multiple locations across surface 104. In particular, vibration readings from a sensor that is a certain distance from the vibration source may be compared to the vibrations at the source. Further, the system may be configured to recognize particular characteristics of the comparison (e.g., a certain reduction in vibration intensity, a certain time delay between the vibrations at the source and the vibrations at the sensor, an amplitude and time delay between an initial wave and a reflected wave, etc.) as indicative of a "dry surface" (i.e., a surface with little or no ice). Therefore, if the sensor readings are indicative of the particular characteristics, then ice detection system 204 may output a signal indicating that there is a dry surface between the sensor and source. Conversely, if the sensor readings are not indicative of the particular characteristics, then ice detection system 204 may output a signal indicating that there is a significant amount of ice on surface 104 between the sensor and the source.

As another example, ice detection system 204 may include light sources and optical sensors for detecting ice on surface 104. As with the above-described implementation using mechanical vibrations, the presence of ice may be determined by comparing current sensor-readings to characteristic readings that would be taken if surface 104 were free of ice. To facilitate this comparison, light sources may be positioned to emit well-defined patterns of light over surface 104, into surface 104, out of surface 104, or in any other direction that provides a path on which the light may interact with the ice (if any ice is present) and propagate to the optical sensors. Ice detection system 204 may use various optical characteristics to determine whether ice is present. For example, changes in optical properties that are indicative of ice may include reductions in the amplitude of transmitted light, increases in the amplitude of reflected light, increases in time delay between emission and detection of light, reflection of light from ice surface, polarization changes, reductions in the amount of light reflected from surface 104, among a variety other characteristics. The actual effects that ice would have on optical readings from the sensors may be determined by calculations or testing.

As a further example, electrical characteristics near interface 108 may be measured as an indicator of whether ice is formed on surface 104. For instance, the electrical resistance of surface 104 may be measured and compared to a "dry surface" resistance value. If ice has formed on surface 104, then the resistance of the surface will be reduced, because ice 102 provides a secondary path for the flow of electrical current. Then, if interfacial layer 106 is vaporized, the resistance will increase again because the electrical path will be disconnected. In other embodiments, ice detection system 204 may include an electromagnetic induction subsystem for inductively exciting electrical currents in ice 102 and a current-measuring subsystem for determining the size and position of such currents. The presence of such induced currents at a point above interface 108 (i.e., in ice 102 or interfacial layer 106) would indicate the existence of ice on surface 104.

As another example, pressure sensors may be used to detect ice 102. In particular, piezoelectric or other pressure sensors may be disposed onto or into surface 104 to detect the presence and weight of ice on surface 104. If surface 104 is oriented such that gravity or other forces are pushing ice 102 down into surface 104, then ice 102 may be detected by an increase in the pressure on the pressure sensors. If forces on ice 102 are acting in another direction, then stress on the pressure sensors in the direction of the force may indicate the presence of ice 102.

Using several sensors at various locations on surface 104, ice detection system 204 may determine one or more locations where ice has formed on surface 104. As indicated previously, characteristics of sensor readings may indicate that ice is between the sensor and its corresponding source of light, mechanical vibration, electrical impulse, or other stimuli. Because pressure sensors detect the presence of ice positioned directly on the sensor, the position of these sensors may also be indicative of the position of ice formation. By aggregating ice-detection readings from several sets of sensors positioned across surface 104 ice detection system 204 may map out where ice forms on surface 104. Ice detection system 204 may use other techniques to more precisely determine the position of the ice. For example, a system may use the speed of sound in surface 104 to calculate the distance from an acoustic sensor to an ice formation based on a reflected sound wave. Because acoustic waves may partially reflect from the edge of an ice formation, the time delay of the reflected wave may be indicative of the distance that the sound wave must travel to reach the ice formation. Other examples are possible.

In addition to detecting the presence of ice, ice detection system 204 may also include devices and systems for determining the thickness of ice 102 on surface 104. In particular, ice detection system 204 may determine the difference between sensor-readings and "dry surface" readings where the difference is related to the thickness of the ice near the sensor. For example, since electrical resistance of a conductive layer is inversely related to the thickness of the layer, ice detection system 204 may determine that ice is thicker near one set of sensors than another set of sensors in response to determining that the electrical resistance is lower near the first set of sensors. Similar techniques may be used in optical-, and acoustic-, and pressure-based systems. In some embodiments, the system may determine the absolute (i.e., quantitative rather than relative) thickness of the ice by, for example, storing characteristic sensor-readings for several thicknesses of ice and comparing current sensor-readings to the stored characteristic readings. In other cases, ice detection system 204 may associate one or more particular threshold values of the sensor readings to threshold thicknesses of ice, without relating these thresholds to the absolute thickness. For example, an acoustic system may associate a sensor reading that is less than a certain proportion of the original vibration amplitude as indicative of a threshold thickness of ice. In some embodiments, an acoustic system may measure the transit time of an acoustic wave reflected from the outer surface of the ice layer, and use this to determine the ice thickness. Other example techniques are possible.

Further, ice detection system 204 may include temperature sensors for determining the temperature of interfacial layer 106, ice 102, and/or surface 104. If sensors detect the temperature of interfacial layer 106 or ice 102, then the system may use this information for determining the necessary quantity of heat to apply in order to substantially vaporize interfacial layer 106. If sensors detect the temperature of surface 104, then the system may know when the surface is hot enough to prevent refreezing. Other uses for ice temperature are also possible.

Ice detection system 204 may also use other sensors and systems to determine characteristics of ice 102. For example, systems that send a signal (e.g., acoustic, optical, electrical, magnetic field) through ice 102, and measure the resulting signal, may be used to determine the makeup of ice 102. For instance, if such a system detects that the ice's magnetic properties differ from characteristic magnetic properties associated with water-based ice, then the system may determine that the ice is not fully water-based ice. In particular, such magnetic changes may result from inclusions of magnetic materials (e.g., iron, cobalt, lead, aluminum, copper, etc.) in the ice. As another example, deicer 200 may use chemical analysis techniques and systems to determine the chemical identity of a constituent of ice 102.

Although ice detection system 204 is shown as a separate system in the arrangement of deicer 200, elements of other systems may be used in detecting the presence and properties of ice 102. For example, optical heat sources, resistance heaters, and inductance heaters from heating system 202 may be used in optical and electrical ice-detecting systems. As another example, vibration system 206 may be used in an acoustic-based detection system. Further, control circuitry 208 may include processing and storage devices for facilitating calculations, storing of sensor-readings, comparison of readings, determination of ice characteristics, and output of results associated with ice detection system 204. In other embodiments, ice detection system 204 may include all components necessary for detecting and outputting indications regarding the presence and properties of ice 102. In additional embodiments, ice detection system 204 may include control circuitry 208 and be operable to output command signals to the other systems in deicer 200. In such an embodiment, ice detection system 204 acts as a deicer control device.

C. Vibration System

As shown on FIG. 2, an example deicer may include a system, such as vibration system 206 for generating and controlling mechanical vibrations along interface 108 to help remove interfacial layer 106 and ice 102. Such a mechanical vibration is intended to loosen or break the connection between interfacial layer 106 and surface 104, due to the acoustoelastic mismatch between interfacial layer 106 and surface 104. The acoustoelastic effect relates to the strain caused when an acoustic disturbance (e.g., a mechanical vibration, sound wave, acoustic impulse, etc.) propagates along the connection between two materials that have different acoustic properties (e.g., elastic modulus, speed of sound, etc.) For example, if a sound wave moves along the interface between two materials that have different speeds of sound, the disturbance may cause different displacements of each material from the original connected state. This difference may cause the materials to alternately compress together and pull apart at the interface, straining the connection. With large enough amplitudes, this strain may even cause interfacial layer 106 to disconnect from surface 104.

Vibration system 206 may include one or more vibration sources and circuitry for operating the sources. Vibration sources may include, for example, actuators, speakers, transducers, motors (especially unbalanced motors), servos, percussive sources, among a variety of other examples. As with heating system 202 and ice detection system 204, vibration system 206 may include vibration sources distributed across surface 108 to provide area-specific vibration patterns. For example, if ice 102 is detected only in one particular area of surface 104, then vibration sources near that area may receive signals causing the sources to apply vibrations to the area, while sources far away from the detected ice may not be signaled. In some cases, the relative timing or phasing of two or more sources can be controlled so as to establish a constructive interference at selected locations (e.g., between two sources). The system may control the site of the constructive interference by varying the timing or phasing.

In addition to controlling whether vibration sources generate vibrations, vibration system 206 may control the amplitude, frequency, propagation direction, and displacement direction of a generated disturbance or vibration. The amplitude may be adjusted by applying more force or energy to the source. For example, more electrical current may be applied to a speaker to increase amplitude. As another example, a stronger push or pull on a percussive source may increase the amplitude of the acoustic disturbance. The frequency of a sound wave may be adjusted by, for example, tuning the gear ratios of a motor source. As another example, the frequency can be changed by changing the frequency of electrical or mechanical energy that is supplied to a source.

The propagation direction of a disturbance is the direction that the disturbance moves through surface 104, interfacial layer 106 and/or ice 102. In some embodiments, a disturbance may move "in-plane" with interface 108, meaning that the disturbance moves parallel to interface 108 along the plane of surface 104. In some cases, this disturbance may be a surface acoustic wave. In other embodiments, the disturbance may move from inside edge 110, through surface 104 and into interfacial layer 106 and ice 102. Further, in some implementations, the disturbance may move from ice 102, into interfacial layer 106, across interface 108 and into surface 104. Other examples are possible. In addition to the plane of propagation, the direction of propagation may include the direction that the wave travels along the plane. For example, an in-plane disturbance may move along interface 108 in any of various particular directions. The direction may be changed by, for example, moving the source, turning the source, selectively dampening disturbances in certain directions from the source, or selectively disturbing one side of a source.

The displacement direction of a disturbance is the direction that particles of a material move when encountering the disturbance. Acoustic disturbances may be generally treated as either transverse (the displacement direction is perpendicular to the propagation direction) or longitudinal (displacement and propagation directions are the same), although other waves are possible. For an in-plane disturbance, a longitudinal displacement may occur when vibration sources push/pull surface 104 and/or ice 102 along an axis that runs parallel to interface 108. Any type of disturbance may be used to remove ice 102. In some cases, vibration system 206 may include parts for producing both transverse and longitudinal waves.

D. Control Circuitry

As shown in FIG. 2, deicer 200 may also include control circuitry 208 for directing functions of deicer 200 and processing signals to/from each of the elements of deicer 200. Control circuitry 208 may include, for instance, a processor and a computer-readable medium (CRM). In other cases, dedicated active circuitry may process input command signals and output result signals that each element receives/transmits as part of the functions described herein. Processor 110 and CRM 112 may be integrally connected in a display device or these elements may connect locally or remotely to a display device.

In the processor-CRM arrangement, the processor may include any processor type capable of executing program instructions in order to perform the functions described herein. For example, the processor may be any general-purpose processor, specialized processing unit, or device containing processing elements. In some cases, multiple processing units may be connected and utilized in combination to perform the various functions of the processor. An example CRM may be any available media that can be accessed by the processor and any other computing, processing, or communication elements in deicer 200. By way of example, the CRM may include RAM, ROM, EPROM, EEPROM, CD-ROM or other optical disk storage, magnetic disk storage or other magnetic storage devices, or any other medium that can be used to carry or store desired program code in the form of program instructions or data structures, and which can be executed by a processor. When information is transferred or provided over a network or another communications connection (either hardwired, wireless, or a combination of hardwired or wireless) to a machine, the machine properly views the connection as a CRM. Thus, any such connection to a computing device or processor is properly termed a CRM. Combinations of the above are also included within the scope of computer-readable media. Program instructions stored on the CRM may include, for example, instructions and data capable of causing a processing unit, a general-purpose computer, a special-purpose computer, special-purpose processing machines, or server systems to perform a certain function or group of functions.

In some embodiments, heating system 202, ice detection system 204, vibration system 206, and/or other connected elements or devices may include separate processing and storage elements for execution of particular functions associated with each system. As an example, ice detection system may store detected thicknesses of ice in a dedicated CRM and use a dedicated processing path to determine, from the stored thicknesses, whether the ice is significantly thick. In this example, ice detection system 204 may function autonomously to detect and assess characteristics of the ice instead of transmitting the observed information to central control circuitry 208. Alternatively, any of the processing, calculating, estimating, determining, or other control functions described above as being performed by the various devices or systems may, alternatively, be performed by control circuitry. In some cases, the control circuitry may be integrated into one of the device to control all the other devices. For example, ice detection system may have control circuitry built into its system that sends control signals to heating system 202 or vibration system 204. In this way, functions recited below as "causing" something to happen may be fully performed by a single element of deicer 200.

E. Surface Modifications

Figure 4:
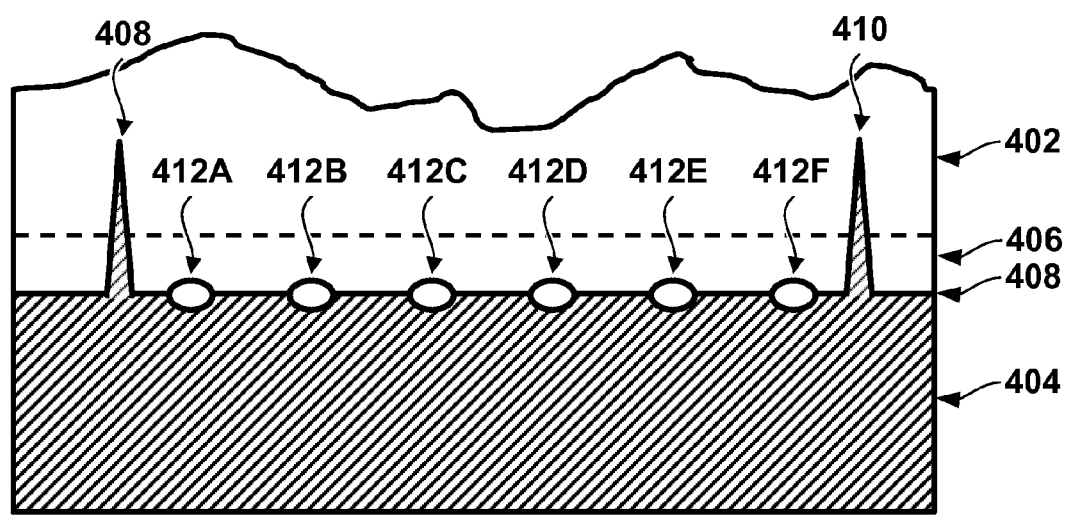
FIG. 4 is a diagram of an example situation in which present embodiments may be used.

In some cases, the deicer may be integrally formed within surface 104 in such a way that surface 104 may be fitted onto parts where ice would typically develop. In this way, deicer 200 would function as an ice-interfacing layer on the outside of an external surface. In such an embodiment, topographical features may be included on surface 104 to interact with ice 102 and interfacial layer 106. In other cases, surface 104 may already have topographical features and deicer 200 may be configured to use these features in removing ice 102. FIG. 4 shows one example of ice 402 (with an interfacial layer 406) on a surface 404 that includes knife edge features 408 and 410. Heating locations 412A-F are positioned along the interface 408 of surface 404 and interfacial layer 406.

For example, a knife-edge feature (i.e., a thin ridge extending into interfacial layer 106) may compromise the structural integrity an crystal structure of ice 102 as it forms. The structurally weakened ice may be more easily vaporized or broken up. Weakened ice may also include more defects (e.g., bubbles, openings) causing the ice to be lighter and more vulnerable to lifting forces from applied gas pressure or pressure from vaporizing ice. Further, protruding features, like knife edges, may help to transfer mechanical vibrations from surface 104 into ice 102. Trenches in surface 104 may be used to protect parts that could be damaged by ice (e.g., rubber tubes from gas-dischargers, heating lasers, acoustic speakers, etc.) Trenches and other grooves may also help prevent refreezing of gaseous particles by providing paths for the gas to dilute or escape.

Deicer 200 may also be programmed to determine where to apply heating based in part on the location and characteristics of topographical features. For example, if a surface includes a grid of knife-edge features defining individual blocks of ice, deicer 200 may not include heating locations, or at least include fewer heating locations, near the knife edges. Such an implementation may help reduce unnecessary heating, because areas directly around the features would likely break off once internal blocks are removed from surface 10 without substantially vaporizing the interfacial layer. In other cases, heating system 202 may be configured to specifically apply heat near the location of the topographical feature. Such an implementation may help in breaking ice into blocks for removal.

In addition to topographical features, surface 104 may be modified so as to make interfacial layer 106 easier to vaporize or make ice 102 easier to remove after interfacial layer 106 is vaporized. For example, surface 104 may be coated with a hydrophobic material (i.e., a material that has very low affinity to water molecules) so that water vapor particles are less likely to condense or gather on the surface in the quantities that would constitute refreezing of interfacial layer 106. If the ice is oil-based rather than water based, an oleophobic substance may be used. In addition to coating surface 104 with a material that lack affinity for the constituents of ice 102, a material may be selected that forms a highly stressed connection across interface 108. For example, crystallographic differences between the topmost material of surface 104 and the material of interfacial layer 106 may produce stress at interface 108, making this connection easier to break through heating or vibration and slowing the refreezing of interfacial layer 106 on surface 104.

F. Other Elements

Some embodiments may include a dedicated power source. For example, a power source may include batteries, capacitors, generators, and/or transformers. Other embodiments may include power-connecting interfaces that are operable to communicate power from external power sources to elements in deicer 200.

In an exemplary embodiment, deicer 200 includes communication interfaces 214 for receiving instructions or signals and outputting readings and results. For example, a user-interface may include buttons, switches, touch screens, keyboards, pointing devices, microphones, visual-recognition devices, and/or other input interfaces for receiving user-input. An example user-input may include, for instance, an allowable range of ice thickness, preset power-saving schemes, alert conditions, information about ambient conditions, ice detection frequency, etc. Additionally, a user-interface may include displays, meters, gauges, audio devices, and/or other output interfaces for displaying current deicing or system conditions. Example user-outputs may include, for instance, current system conditions, current thickness/temperature of ice, malfunctions/warnings, requests for information, etc.

Deicer 200 may also include interfaces 214 for communicating with remote devices. For example, deicer 200 may send user-output information to remote display devices or systems so that the remote devices may present results and conditions to local or remote operators. In such a situation, deicer 200 may also include interfaces for receiving instruction signaling from external resources, so that the system may be monitored and controlled remotely. As another example, system conditions may be reported and stored on remote servers or memory devices for subsequent analysis. Such embodiments of communication interfaces 214 may include, for example, wireless chipsets, antennas, wired ports, signal converters, communication protocols, intranet connections, Internet connections, telephone systems, cable connections, disk drives, media cables, removable memory chips, and other hardware and software for interfacing with external systems.

Deicer 200 may include many other features in accordance with various embodiments. For instance, deicer 200 may include an external protective surface or casing to enclose various parts and systems of the deicer. Other deicing systems may include mounting hardware. As another example, deicer 200 may include equipment that monitors the functions and state of deicer 200 itself, to check for malfunction.

G. Other Embodiments

Figure 5:
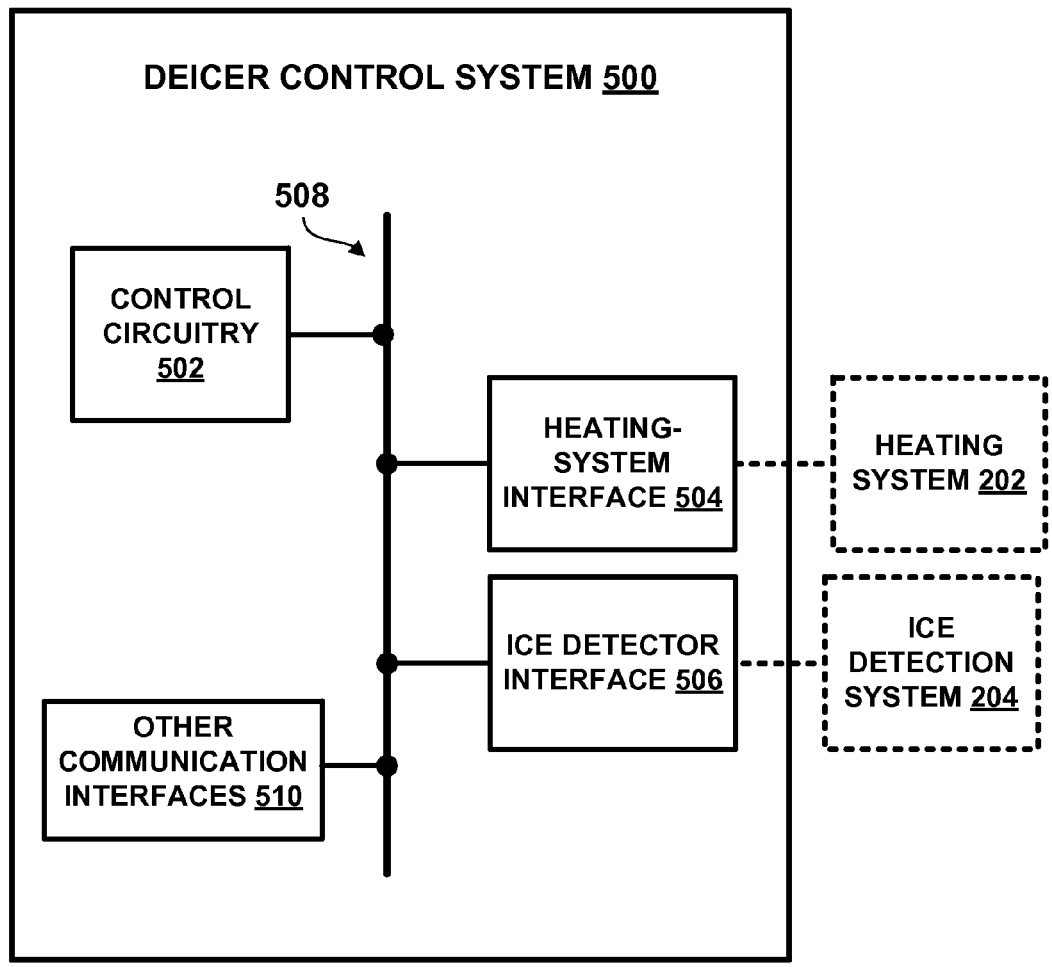
FIG. 5 is a schematic diagram illustrating elements of a deicer according to an exemplary embodiment.
Figure 6:
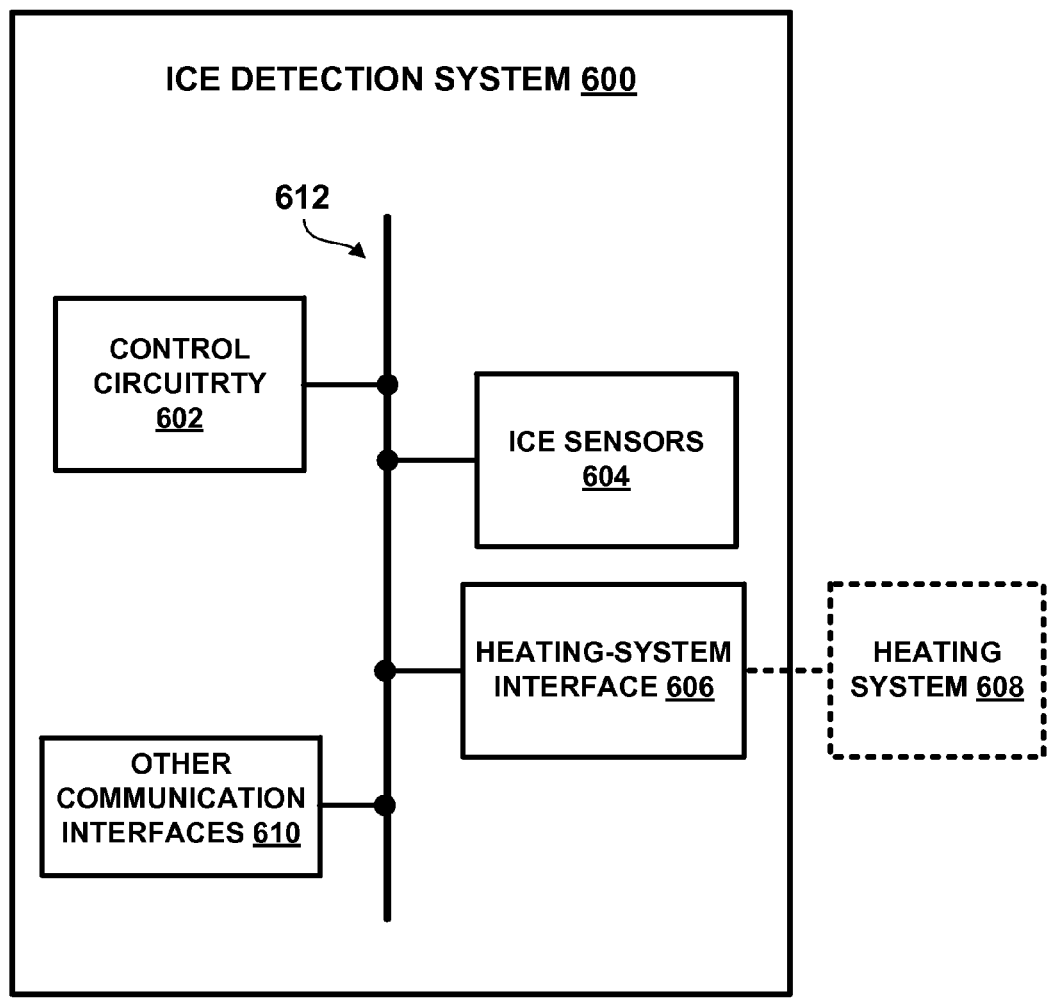
FIG. 6 is a schematic diagram illustrating elements of an ice detection system according to an exemplary embodiment.

FIGS. 5 and 6 show example arrangements of elements that may be used in a deicer control system 500 and an ice detection system 600. As shown, each of these systems may include elements for controlling the deicing process without directly performing heating, vibration, gas-pressure application, or other steps associated with deicing. Other arrangements are possible.

As shown in FIG. 5, in accordance with an exemplary embodiment, deicer control system 500 includes control circuitry 502 coupled by system bus 508 to interfaces 504, 506, and 510. As shown, heating-system interface 504 may communicatively connect deicer control system 500 to heating system 202. Also as shown, ice detector interface 506 may communicatively connect deicer control system 500 to ice detection system 204. Other communication interface 510 may include any other external connections that are used in controlling a deicing procedure, such as vibration system interfaces, gas-flow interfaces, user-interfaces, and/or interfaces to external processing, among other possibilities.

As shown in FIG. 6, in accordance with an exemplary embodiment, ice detection system 600 includes control circuitry 602 and ice sensors 604 coupled by system bus 612 to interfaces 606 and 610. Sensors 604 may include any of the signal producing and sensing elements described above with respect to ice detection system 204. As shown, heating-system interface 606 may communicatively connect ice detection system 600 to heating system 202. Other communication interface 610 may include any other external connections that are used in controlling a deicing procedure, such as vibration system interfaces, gas-flow interfaces, user-interfaces, and/or interfaces to external processing, among other possibilities.

II. Example Operation

Functions and procedures described in this section may be executed according to any of several embodiments. For example, procedures may be performed by specialized equipment that is designed to perform the particular functions. As another example, the functions may be performed by general-use equipment that executes commands related to the procedures. As a further example, each function may be performed by a different piece of equipment with one piece of equipment serving as control or with a separate control device.

Figure 7:
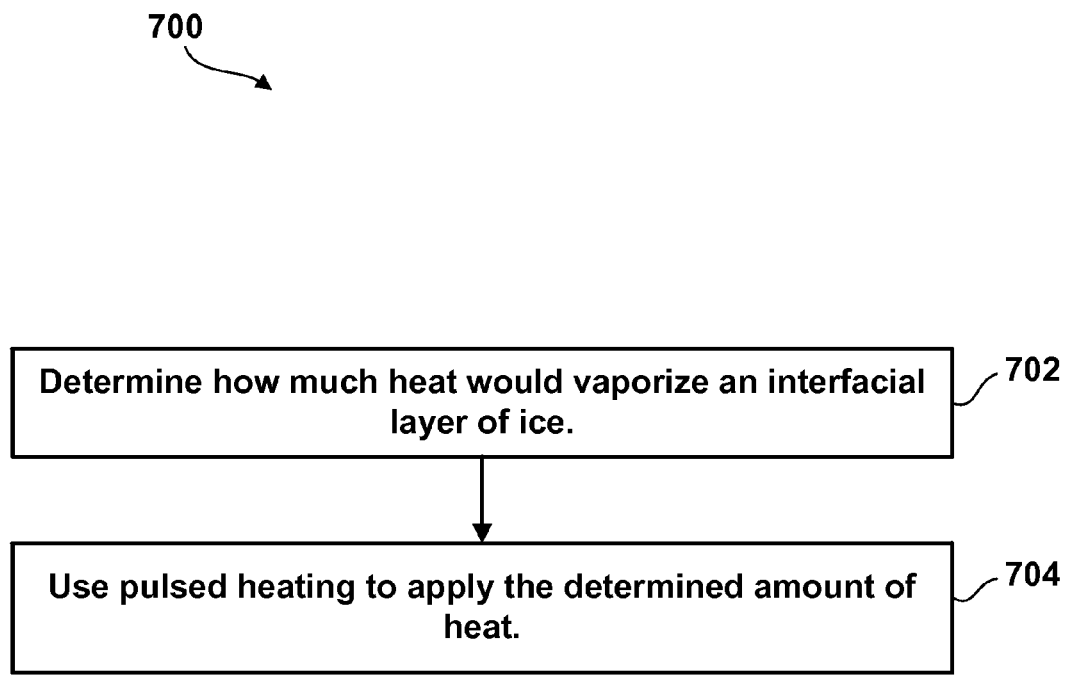
FIG. 7 is a flowchart showing process steps according to an exemplary embodiment.

FIG. 7 is a flowchart illustrating a method 700 according to an exemplary embodiment. As shown, method 700 involves determining how much heat would vaporize an interfacial layer of ice (step 702). Method 700 further includes using pulsed heating to apply the determined amount of heat (step 704).

Figure 8:
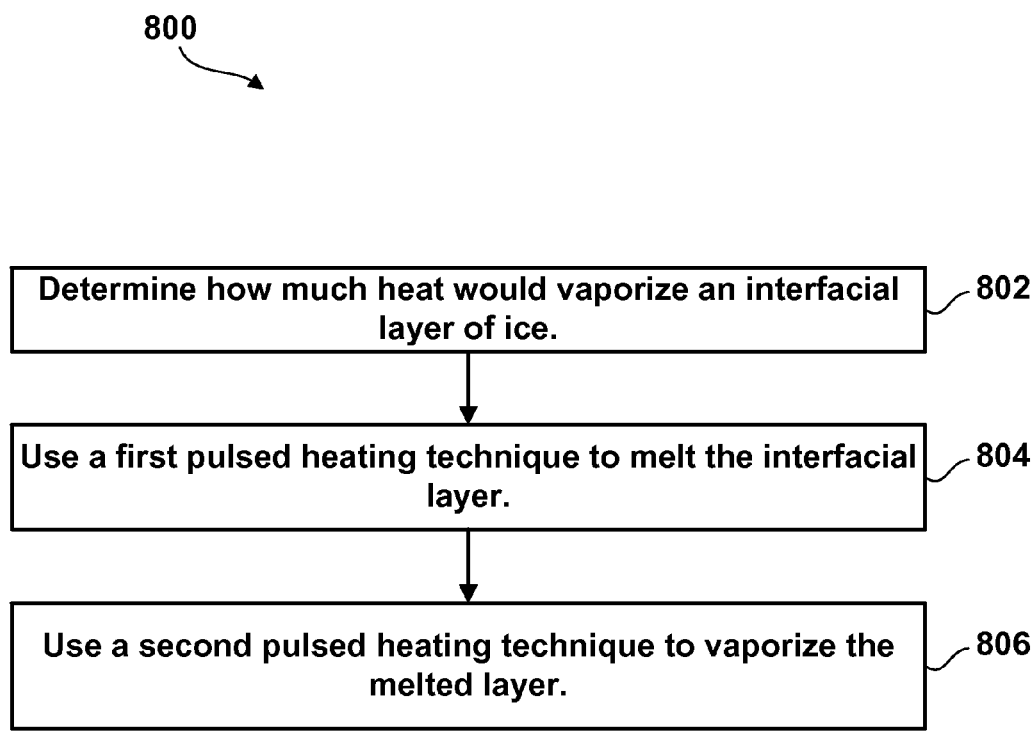
FIG. 8 is a flowchart showing process steps according to an exemplary embodiment.

FIG. 8 is a flowchart illustrating another method 800 according to an exemplary embodiment. As shown, method 800 involves determining how much heat would vaporize an interfacial layer of ice (step 802). Method 800 further includes using a first pulsed heating technique to melt the interfacial layer (step 804). Method 800 further includes using a second pulsed heating technique to vaporize the melted layer (step 806).

Figure 9:
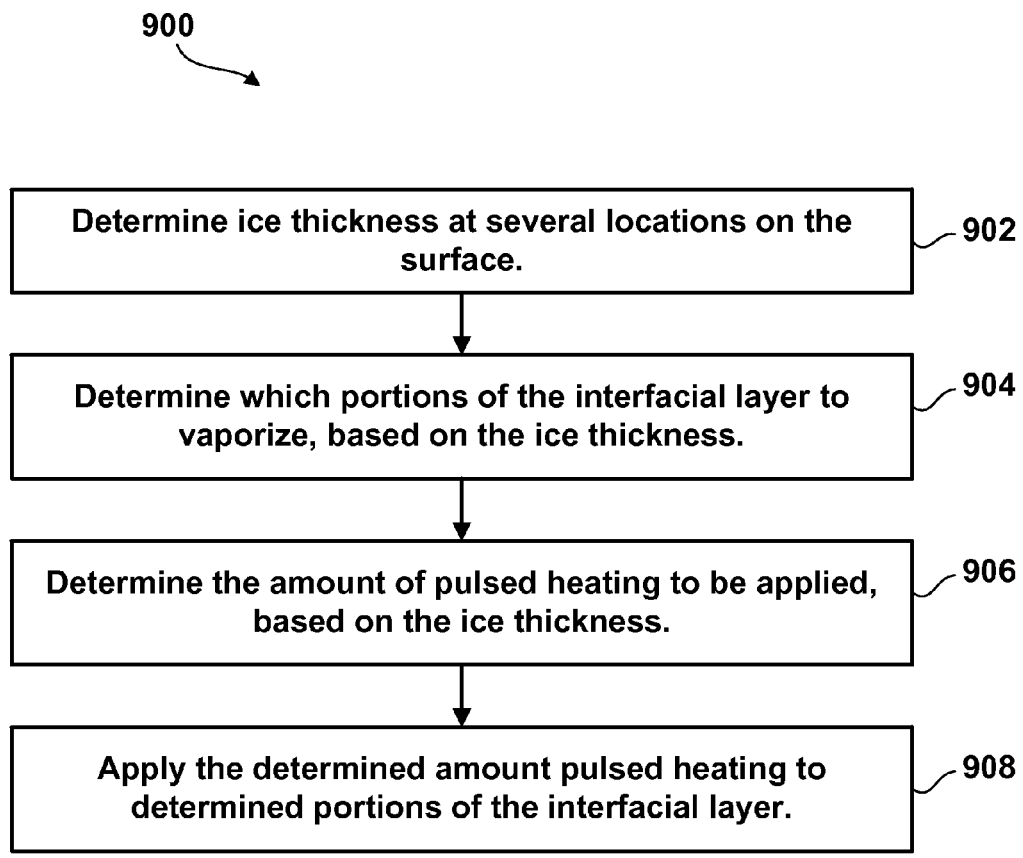
FIG. 9 is a flowchart showing process steps according to an exemplary embodiment.

FIG. 9 is a flowchart illustrating another method 900 according to an exemplary embodiment. As shown, method 900 involves determining ice thickness at several locations on a surface (step 902). Method 900 further includes determining which portions of the interfacial layer to vaporize, based on the ice thickness (step 904). Method 900 further includes determining the amount of pulsed heating to be applied, based on the ice thickness (step 906). Method 900 further includes applying the determined amount of pulsed heating to determined portions of the interfacial layer (step 908).

Figure 10:
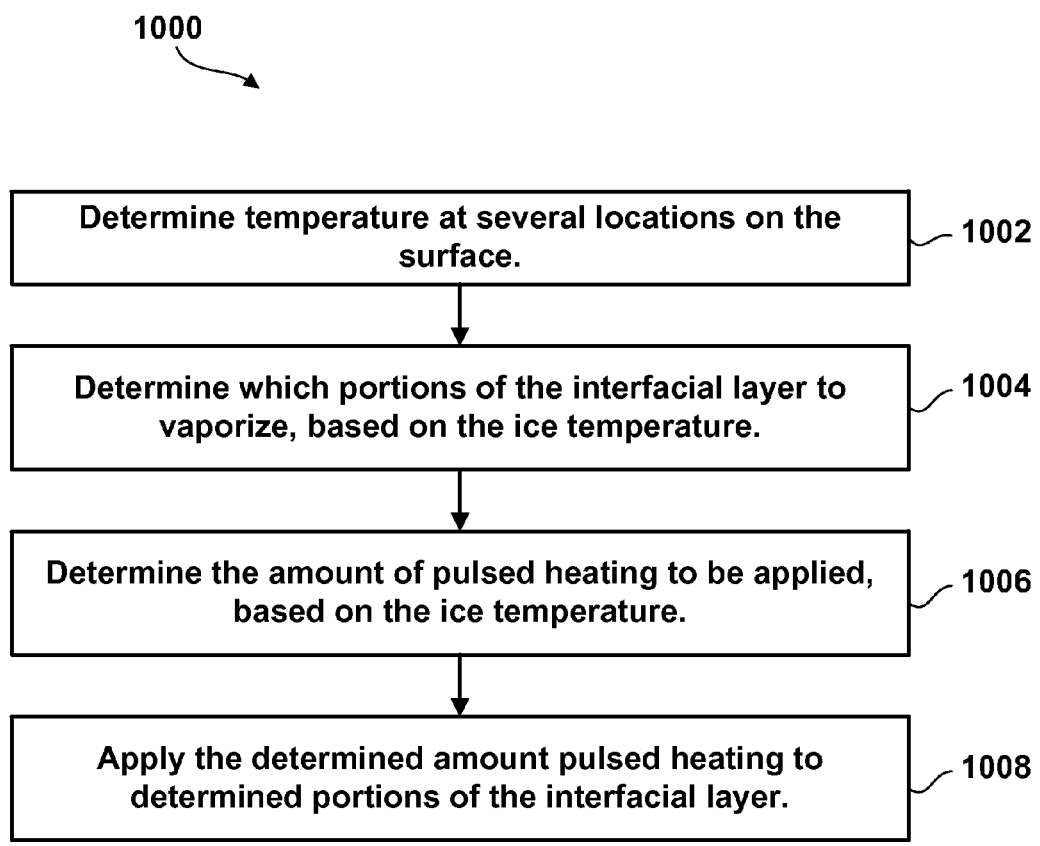
FIG. 10 is a flowchart showing process steps according to an exemplary embodiment.

FIG. 10 is a flowchart illustrating another method 1000 according to an exemplary embodiment. As shown, method 1000 involves determining temperature at several locations on a surface (step 1002). Method 1000 further includes determining which portions of the interfacial layer to vaporize, based on the temperature (step 1004). Method 1000 further includes determining the amount of pulsed heating to be applied, based on the temperature (step 1006). Method 1000 further includes applying the determined amount of pulsed heating to determined portions of the interfacial layer (step 1008).

Figure 11A:
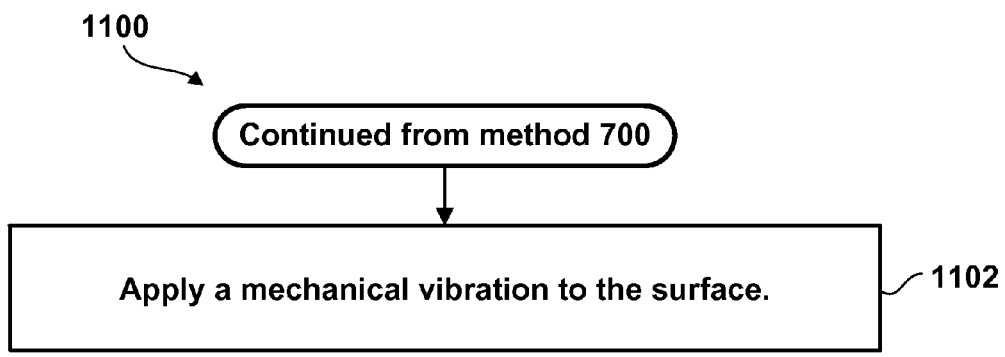
FIG. 11A is a flowchart showing an example process step that may be performed in combination with steps shown in FIG. 7.
Figure 11B:
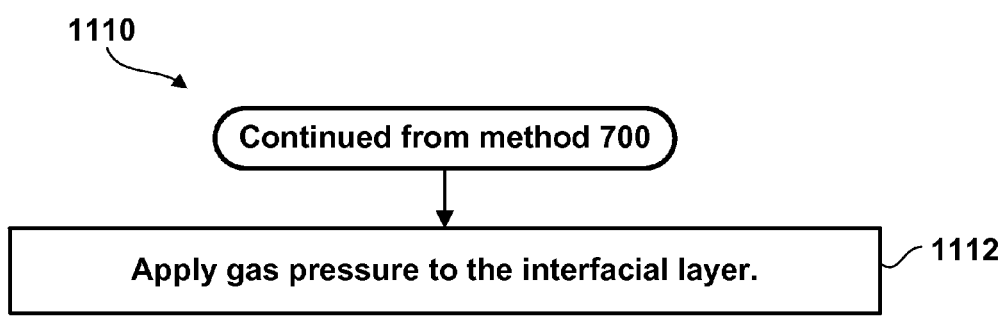
FIG. 11B is a flowchart showing an example process step that may be performed in combination with steps shown in FIG. 7.

FIGS. 11A and 11B are a flowchart steps illustrating other exemplary steps that may be done in addition to the steps of method 700 according to an exemplary embodiment. As shown in FIG. 11A, method 1100 includes applying a mechanical vibration to the surface (step 1102). As shown in FIG. 11B, method 1110 includes applying gas pressure to the interfacial layer (step 1112).

Although FIGS. 7-11B show particular steps and particular step orderings, exemplary methods may include additional steps, omit shown steps, or reorder the steps in a variety of ways. In the following sections, aspects of each illustrated method, along with other exemplary procedures, are discussed with reference to the systems illustrated in FIGS. 1-4 and the example methods of FIGS. 7-11B.

A. Determining Ice Characteristics

Deicer 200 may use various sensors and systems (generalized in some cases as ice detection system 204) to determine properties of ice 102. For example, deicer 200 may use sensors to detect the thickness of the ice at various positions across surface 204. As another example, deicer 200 may use other sensors to determine the temperature of the ice. Further still, deicer 200 may determine the chemical/material profile for ice 102. Other examples are possible.

Deicer 200 may detect the thickness of ice at various positions on surface 104. The thickness at other locations may be determined by interpolation or extrapolation of the measured thickness at specific sites. Example detection devices and techniques are discussed in more detail in a previous section with respect to ice detection system 204. In some cases, deicer 200 may detect a numerical value of thickness for each portion of the ice. In other cases, deicer 200 may detect several discrete levels of thickness (e.g., very thin, thinner, thin, normal, thick, etc.) to characterize ice thickness. In still other cases, deicer 200 may use only a single threshold level of thickness. For example, the single threshold level may be a thickness that is indicated as undesirable by a user or computing control entity. As another example, the threshold thickness may be set below the undesirable thickness to help prevent ice from attaining the undesirable thickness while deicer 200 is attempting to remove it. As still another example, a single threshold thickness may be set at a very small ice thickness, so the thickness sensors simply detect the presence of ice on a portion of surface 104. In this arrangement, ice detection system 204 may function as an ice detector, sensing areas of ice accumulation rather than ice thickness.

In some embodiments, deicer 200 may detect temperature at or above surface 104. The temperature at some locations along the surface may be determined by interpolation or extrapolation of the measured temperature at specific sites. As with thickness, ice temperature may be treated as a numerical value, as a qualitative grouping value, or as a two-state value. A two-state value of temperature may be related to a physical threshold value (e.g., temperature of fusion for the material in ice 102, temperature of ice formation for water-based ice) or related to an indicated threshold temperature (e.g., a temperature that is indicated by user-input or control signaling from control circuitry 208).

In some cases, determination of ice characteristics may involve receiving indications of the ice characteristics from external sensors, control circuitry 208, or communication interfaces 316. Ice detection system 204 may then use the indicated values as the determined ice characteristics. In other cases, ice detection system 204 may generate characteristics data.

In some cases, deicer 200 may detect ice characteristics occasionally to facilitate monitoring of current ice properties. For example, ice detection system 204 may detect ice characteristics periodically. As another example, ice detection system 204 may detect ice characteristics in response to a signal from control circuitry 208 or communication interfaces 214. As still another example, one subsystem in ice detection system 204 may signal another subsystem to initiate detection of ice characteristics by the second subsystem. For instance, when ice-temperature sensors detect a threshold cold temperature, the temperature system may send control signaling to elements related to determination of ice thickness, instructing the ice-thickness subsystem to determine ice thickness. The opposite situation, with ice-thickness sensors signaling the ice-temperature subsystem, is also possible.

In practice, ice detection system 204 may change the frequency with which it checks characteristics in response to different stimuli. For example, ice detection system 204 may check the ice characteristics very rarely when little ice has been detected and increase the frequency in accordance with increasing quantities of detected ice. As another example, ice detection system 204 may detect ice characteristics very frequently when heating system 202 is in use, to provide feedback to heating system 202.

B. Determining Amount of Heating to Apply

Control circuitry 208 may include processing elements configured to determine how much heat to apply to each portion of surface 104 in order to efficiently remove ice 102. In some cases, the system may determine the amount of heat necessary to substantially vaporize a portion of interfacial layer 106. In other cases, the system may determine how much heat is necessary to prevent an already vaporized portion of interfacial layer 106 from refreezing to surface 104. In an embodiment that melts interfacial layer 106 and then vaporizes the melted layer, as in method 800 of FIG. 8, the system may determine the heat needed to perform each step of this two-step vaporization process.

The amount of heat may be, for instance, heat fluence (how much heat transfers across interface 108 into interfacial layer 106), heat flux (vector representation of heat transferred per unit of time), heat flux density (vector representation of heat flux per unit of surface area), heat flow rate (scalar representation of heat flux), or heat flow density (scalar representation of heat flux density), among other possibilities. In some cases, the amount of heat may be represented with a heat component and a temporal or spatial component as well. For example, the determined amount of heat may be reported as a heat flow rate and a time to particularly specify how heat should be applied.

The amount of heat necessary to vaporize interfacial layer 106 may depend on the temperature, thickness, material properties, and water concentration of interfacial layer 106. The necessary heat is dependent on starting ice-temperature because, in order to reliably vaporize the ice, it may be necessary to heat the ice, liquid, or vapor to a temperature above the ice material's natural boiling point. Therefore, if the initial temperature of interfacial layer 106 is colder, then the system may determine that more heat would be necessary to substantially vaporize interfacial layer 106. The thickness of interfacial layer 106 (as differentiated from the thickness of ice 102) influences the amount of heat needed for vaporization because, for example, the thickness of this layer may determine the amount of ice that is needed to be vaporized. The material properties of interfacial layer 106 may influence the amount of heat needed for vaporization because, for example, properties like density and crystallinity may determine how much material is contained in a volume of ice and how easily heat is transferred through interfacial layer 106. The water concentration of interfacial layer 106 may also influence the amount of heat needed for vaporization because, for example, the concentration of impurities in water may influences the boiling and vaporizing temperatures of interfacial layer 106. Other factors may also be taken into consideration.

In some embodiments, testing may be done to determine the relationship between the applied heat and the amount of vaporization. For example, the system may apply pulsed heating to one portion of interfacial layer 106 and then use ice detection system 204 to determine how much vaporization the heating caused. In other embodiments, the system may determine the necessary amount of heat from phase-change analysis, or some other analysis technique, without testing the system. For example, deicer 200 may store formulas and values for determining how much heat to apply to interfacial layer 106. Hence, deicer 200 may automatically determine the amount of heating to be applied to vaporize interfacial layer 106, without requiring testing or external input.

As a particular example of stored information, it is known that to sublimate one gram of water-based ice at 0° C., a system must, in some cases, apply at least 2,591 Joules of energy. Other heats of sublimation may be used for non-water-based ice and for determined concentrations of constituents in the ice. By inputting the mass of interfacial layer 106 and the starting temperature, such a formula may be used to determine how much heating is necessary to vaporize interfacial layer 106. The mass of the interfacial layer may be determined, for example, by determining the density of interfacial layer 106 and then estimating the thickness of interfacial layer 106 based on the frequency of the pulsed heating. In practice, heating system 202 may need to apply more energy to compensate for losses of heat throughout the system. In one arrangement, control circuitry 208 processes characteristic values received by input or detected by sensors before any heating is applied. In this way, the system may determine the amount of heat necessary to substantially vaporize interfacial layer 106 before applying this heat to interfacial layer 106. In some embodiments, results of the applied heat may then be used to determine effectiveness.

In addition to determining the amount of heat to apply for vaporization, deicer 200 may determine where to apply this heat. In some cases, an example deicer may determine that heat should be applied across the entirety of interface 108, resulting in vaporizing the interfacial layer at all points across surface 204. In other cases, deicer 200 may vaporize particular portions of interfacial layer 106, while not vaporizing other portions. Additionally, deicer 200 may melt some or all of the non-vaporized areas of interfacial layer 106.

By logically selecting particular portions of interfacial layer 106 to vaporize, deicer 200 may help to remove ice 102 without expending the resources necessary to vaporize the entirety of interfacial layer 106 or ice 102. For example, when deicer 200 vaporizes a portion of interfacial layer 106, the expanding vapor may exert a pressure on the surrounding ice. This pressure may produce strain in the portion of ice 102 that overlays the vaporized layer and in the surrounding interfacial layer. If sufficient strain is produced in surrounding portion of interfacial layer 106, then these portions may be pull away from surface 104 without needing to be vaporized. Alternatively, if sufficient strain is produced in the overlaying ice, then the overlaying ice may crack, weakening ice 102's structure to facilitate removal.

Deicer 200 may select portions of interfacial layer 106 to vaporize in one of several ways. In some cases, the separation between the selected portions may be chosen based on the thickness of the ice layer. In some cases, deicer 200 may vaporize connected portions of interfacial layer 106 to form lines and other patterns of weakened or broken ice. For example, deicer 200 may vaporize portions of interfacial layer 106 that form one or more lines across surface 104. Using such a technique, deicer 200 may create a fault lines in ice 102 that weaken the overall strength of ice 102. As another example, deicer 200 may vaporize a border enclosing an area of ice. The isolated areas of ice may then be more easily removed.

In some cases, deicer 200 may determine when to apply heat to each portion of interfacial layer 106. For example, once deicer 200 has vaporized a line of interfacial layer 106, it may then be beneficial to vaporize the portions of interfacial layer 106 that are immediately adjacent to the original vaporized line. Because each vaporized portion of ice can exert pressure on its surrounding ice, such a sequence of vaporization may require less heat to separate ice 102 from surface 104. As another example, after deicer 200 vaporizes interfacial layer 106 on a border around an area of ice 102, the system may determine that it should apply heat to a concentric area inside of the border, decreasing the size of the enclosed ice. At some point, the enclosed area of ice may break off from surface 104. Such a technique may preserve power resources, since deicer 200 may not need to apply heat to any portion of interfacial layer 106 that breaks off rather than being vaporized. As a further example, deicer 200 may determine that a certain amount of heat should be applied to vaporize interfacial layer 106 and then a lower amount of heat should be applied to keep interfacial layer 106 from reforming.

In some cases, ice thickness and ice temperature measurements may be used in determining which portions of interfacial layer 106 to vaporize. For example, if ice-thickness measurements indicate that significantly thick ice is present only in several separated areas, then deicer 200 may vaporize the interfacial layer 106 under only those portions of ice. As another example, if ice temperature measurements indicate that certain portions of interfacial layer 106 are warmer than others, then deicer 200 may select the warmer pockets of interfacial layer 106 to vaporize. As still another example, if no sufficiently thick ice is detected in an area, then deicer 200 may refrain from applying heat to that area.

In some embodiments, deicer 200 may also be programmed to determine where to apply heating based in part on the location and characteristics of topographical features. For example, some embodiments may involve vaporizing only the portions of interfacial layer 106 that are adjacent to topographical features. The vapor pressure produced by such a technique may be more likely to break ice 102, since it occurs near a point of weakness. In FIG. 4, such a technique may involve applying pulsed heating at heating locations 412A and 412F, so that breaking may likely occur at the portions of ice 402 above features 408 and 410. As another example, heating may be applied a preset distance away from topographical features (e.g., heat applied at heating locations 412C and 412D). As described previously, some ice near topographical features 408 and 410 may be weaker than other portions of ice 402. Therefore, if heat is applied at heating locations 412C and 412D, vapor pressure produced at these heating locations may break free the ice around features 408 and 410. For this reason, deicer 200 may be configured to vaporize interfacial layer 406 at heating locations that are a certain distance away from topographical features, such as features 408 and 410.

As heating is applied, control elements in deicer 200 may continue to determine how much heat to apply to each heating location across surface 104. Such a technique may involve receiving updates from ice detection system 204, communication interfaces 214, and other components. For example, if heat is being applied at a particular heating location, and ice detection system 204 detects that there is no ice at that heating location, then deicer 200 may stop applying heat at the location.

In some embodiments, deicer 200 may take ambient forces and conditions into consideration when determining how heat should be applied to vaporize interfacial layer 106. Ambient conditions can include, for example, air temperature, air pressure, wind speed, humidity. direction of gravity, and external forces, among other possibilities. For example, in response to detecting a consistent external wind force, deicer 200 may determine a portion of ice 102 that receives the maximum effect from the wind force and determine that heating should be applied to this area. Once the portion of interfacial layer 106 that is in the area of maximum effect is vaporized, the wind force may aid in the removal of that portion of ice 102. In some cases, the area of maximum effect may be received by deicer 200 via communication interfaces 214, rather than calculated dynamically. For example, if surface 104 is part of an airplane wing, the prevailing direction of the air flow over this surface may be known and preloaded into control circuitry 208, along with a heating sequence that starts near the area of maximum effect. In practice, the area of maximum effect may be determined based on how easily it could be removed by wind force and based on an estimation of how much surrounding ice will be taken with it. For this reason, an area of maximum effect may be close to the front end of a moving body (e.g., car windshield, plane wing, turbine blade, etc.). Other ambient forces, such as gravity or air pressure, may also be used in determining where and when to apply heating.

C. Vaporizing an Interfacial Layer

Once the appropriate amount of heating is determined, heating system 202 may output the determined amount of heat in order to vaporize interfacial layer 106. Heating may be applied in any of the various ways described above with respect to heating system 202. In some cases, heating system 202 may contain control elements to control the particular heating elements. In such an implementation, heating system 202 may receive signaling from control circuitry 208, or other control elements, that indicates the amount of heat to be applied at each area of surface 104. In other cases, deicer may receive signaling that controls the heating elements directly. In this case, heating system 202 is a passive element, acting on behalf of another device or system.

In order to keep the applied heat from spreading throughout ice 102, deicer 200 may apply pulsed heating (i.e., heating that is not continuous in amplitude). In some pulsed heating techniques, the heating may be applied for a first duration and then not applied for a second duration. In other embodiments, heating may be reduced, but not eliminated, during the second duration. In order to better control heat transfer, other embodiments may include more complicated sequences of reducing heat, increasing heat, and turning heat off. In order to ensure that the applied heat does not spread throughout ice 102, the duration of the heating pulses may be on the order of milliseconds or more preferably on the order of microseconds. The duration may also be selected based on thermal diffusion across the interfacial layer 106. Some implementations of pulsed heating may repeatedly alternate between high and low output temperatures, producing a successive (e.g., periodic) sequence of heating pulses.

In some embodiments, a control system or device may select the amplitude and timing of heating pulses may be controlled to achieve the desired vaporization of interfacial layer 106 and the removal of ice 102. For example, if one portion of interfacial layer 106 is not as cold as an adjacent portion of interfacial layer 106, then deicer 200 may shorten the timing of the pulses at the warmer portion. In this way, the deicer may increase the chances that both portions of interfacial layer 106 are vaporized simultaneously.

In some cases, deicer 200 may vaporize interfacial layer 106 by applying the necessary heat to sublimate (turn directly from solid to gas) the ice at interface 108. In practice, some of interfacial layer 106 may melt before vaporizing, instead of sublimating. In other cases, deicer 200 may apply the appropriate amount of heat to melt interfacial layer 106 first and, then, apply the heat necessary to vaporize the melted interfacial layer 106. In such a procedure, the heat to melt the interfacial layer and the heat to vaporize the melted liquid may be applied by separate heating device or systems.

D. Applying Vibrations and Gas Pressure

As shown by steps 1102 and 1112 of methods 1100 and 1110, some embodiments may involve applying additional forces to aid in removal of ice 102. In particular, an example deicer may apply mechanical vibrations to interfacial layer 106 to break up the connection between ice 102 and surface 104. Additionally or alternatively, gas pressure may be applied at interfacial layer 106.

Mechanical vibrations may be applied in various ways as described previously. In some cases, mechanical vibrations may be applied periodically to break up any ice has been weakened by deicer 200. In other cases, mechanical vibrations may be produced in response to receiving control signaling instructing vibration system 206 to produce vibrations. In still other cases, vibration system 206 may produce vibrations in response to receiving signaling that indicates the presence of ice, without receiving instruction signals. In other cases, mechanical vibrations may be applied at all times that deicer 200 is on.

In some embodiments, vibration system 206 may function as a single system to apply, or not apply, vibrations across the all of surface 104. In other cases, vibration sources may be independently addressed so that particular portions of surface 104 receive vibrations. In this way, certain portions of interfacial layer 106 may be broken at one time, without disturbing other ice portions.

When vibration system 206 is controlled by control circuitry 208, vibrations may be sent in response to determining that interfacial layer 106 is in a certain situation. For example, vibrations may be applied if heating has recently been applied to vaporize areas at or near portions of interfacial layer 106 and ice is still detected in the area. As another example, if heating is currently being applied to an area, vibrations may also be applied. As a further example, vibrations may be applied to ice-covered areas that are adjacent to areas where ice recently was removed. Other examples are possible.

In applying vibrations to a surface that has topographical features, vibration system 206 may specifically apply vibrations to areas around the topographical features. Additionally, vibrations may be applied in a direction that increases the effect of topographical features in vibration transfer. For example, if surface 104 has linear ridges projecting outward from its surface, then mechanical vibrations may be applied with a displacement direction perpendicular to the linear ridge and parallel to interface 108. In this way, the ridge may apply a majority of the vibration force directly into interfacial layer 106. As another example, if pointed topographical features are disposed on a surface, like knife edges 408 and 410, then vibrations may be applied with a displacement direction that is perpendicular to the plane of surface 104.

Gas may be provided for several reasons. For example, gas may be applied to increase the gas pressure at pockets of vaporized material. In this way, the vaporized portions of interfacial layer 106 may be used to for breaking up ice 102 and surrounding portions of the interfacial layer. As another example, heated gas may be applied to help in the melting and vaporization process or to help prevent refreezing by warming the area. As a further example, conditioned gas may be applied to replace vaporized gas being vented away from the interface. Such a technique may also help to prevent refreezing by removing vapor particles that are likely to refreeze. Other examples are possible.

In some embodiments, gas may be applied to certain areas in response to detecting a situation where gas may be beneficial. In other embodiments, gas may be applied at all gas outlet locations at a certain pressure. In such an implementation, gas would only be released at locations where the certain pressure is sufficient to push gas into interfacial layer 106 at that location. For example, gas would be released where interfacial layer 106 had already been vaporized or broken.

III. Conclusion

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for controlling the removal of a layer of ice from a solid surface, the control system comprising:
    control circuitry operable to determine a necessary quantity of heat to substantially vaporize an interfacial layer between the solid surface and the layer of ice; and
    a heating system interface communicatively coupling the control circuitry to a heating system that is configured to apply pulsed heating at the interfacial layer, wherein the control circuitry is configured to instruct the heating system to apply the pulsed heating with the determined necessary quantity of heat to substantially vaporize the interfacial layer so as to separate the layer of ice from the solid surface.

2. The control system of claim 1, wherein the control circuitry is configured to instruct the heating system to apply pulsed heating to a plurality of separated areas of the interfacial layer.

3. The control system of claim 2, wherein the control circuitry is configured to:
determine a thickness of the layer of ice; and
determine a distance between the plurality of separated areas, based on the determined thickness of the layer of ice.

4. The control system of claim 2, wherein the pulsed heating is applied to a first area of the plurality of separated areas before the pulsed heating is applied to a second area of the plurality of separated areas.

5. The control system of claim 1, wherein the control circuitry is configured to control an electromagnetic radiation source of the heating system.

6. The control system of claim 5, wherein the electromagnetic radiation is emitted from the solid surface into the interfacial layer, wherein a main frequency of the electromagnetic radiation is strongly absorbable in ice.

7. The control system of claim 1, wherein the control circuitry is configured to:
instruct a first heating subsystem to melt the layer of ice at the interfacial layer to produce a liquid; and
instruct a second heating subsystem operable to vaporize the liquid water.

8. The control system of claim 1, wherein the control circuitry is configured to determine a necessary quantity of heat to sublimate a portion of the interfacial layer.

9. The control system of claim 1, wherein the control circuitry is configured to instruct an ice detection system to determine the thickness of the ice using electrical techniques.

10. The control system of claim 1, wherein the control circuitry is configured to determine, based on received indications, locations where the thickness of the layer of ice is thinner than a threshold thickness, and wherein the control circuitry is configured to instruct the heating system to apply pulsed heating to the detected locations.

11. The control system of claim 1, further comprising an ice detector interface, communicatively connecting the control circuitry to an ice detection system, wherein the control circuitry is configured to:
(i) receive, via ice detector interface, indications of a thickness of the layer of ice at each of one or more locations on the interfacial layer, and
(ii) vary, based on the indicated thickness of the layer of ice any of the one or more locations, an amount of the pulsed heating that is applied to the interfacial layer at the one or more locations.

12. The control system of claim 1, further comprising a thermometer interface, communicatively connecting the control circuitry to a temperature detection system, wherein the control circuitry is configured to:
(i) receive, via thermometer interface, indications of a temperature at each of one or more locations on the interfacial layer, and
(ii) based on the indicated temperature at a location, determine whether to apply the pulsed heating to each of the one or more locations.

13. A deicing method comprising:
detecting a layer of ice on a solid surface;
determining whether to initiate vaporization of an interfacial layer between the solid surface and the layer of ice based at least in part on a sensed temperature of the interfacial layer; and
using pulsed heating to vaporize the interfacial layer between the solid surface and the layer of ice in response to determining that the sensed temperature is below a threshold temperature.

14. The method of claim 13, wherein the pulsed heating is applied to a plurality of separated areas of the interfacial layer.

15. The method of claim 14, further comprising:
determining a thickness of the layer of ice; and
determining a distance between the plurality of separated areas, based on the determined thickness of the layer of ice.

16. The method of claim 13, wherein the pulsed heating is applied using electromagnetic induction.

17. The method of claim 13, wherein applying the pulsed heating is performed by applying electromagnetic radiation to the interfacial layer.

18. The method of claim 17, wherein the electromagnetic radiation is produced by a laser source.

19. The method of claim 17, wherein the electromagnetic radiation is emitted from the solid surface into the interfacial layer, and wherein a main frequency of the electromagnetic radiation is strongly absorbable in the ice.

20. The method of claim 13, wherein using pulsed heating to vaporize a majority of the interfacial layer comprises:
initially using a first heating technique to melt the interfacial layer, producing a liquid; and
subsequently using a second heating technique, different than the first heating technique, to substantially vaporize the liquid.

21. The method of claim 13, further comprising:
determining a thickness of the layer of ice at each of one or more locations on the interfacial layer; and
determining which portions of the interfacial layer to vaporize, based on the determined thicknesses.

22. The method of claim 21, wherein determining where to apply the pulsed heat comprises:
detecting, on the interfacial layer, locations where the thickness of the layer of ice is thinner than a predefined threshold thickness; and
refraining from vaporizing the interfacial layer at the detected locations.

23. The method of claim 21, wherein determining which portions of the interfacial layer to vaporize comprises:
detecting, on the interfacial layer, locations where the thickness of the layer of ice is at least a predefined threshold thickness; and
vaporizing the interfacial layer at the detected locations.

24. The method of claim 13, further comprising:
sensing a temperature of the interfacial layer at each of one or more locations; and
using each temperature to determine whether to vaporize the interfacial layer at each of the one or more locations.

25. The method of claim 24, further comprising:
using at least one of the sensed temperatures to determine a temperature at an additional location on the interfacial layer; and
using the determined temperature at the additional location to determine whether to vaporize the interfacial layer at the additional location.

26. A deicing method comprising:
  detecting a layer of ice on a solid surface using a sensor;
  determining a necessary quantity of heat to substantially vaporize an interfacial layer between the solid surface and the layer of ice; and
  causing pulsed heating to be applied at the interfacial layer, wherein the pulsed heating is applied with the determined necessary quantity of heat to substantially vaporize the interfacial layer so as to separate the layer of ice from the solid surface.

27. The method of claim 26, wherein the pulsed heating is applied to a plurality of separated areas of the interfacial layer.

28. The method of claim 27, further comprising:
  determining a thickness of the layer of ice; and
  determining a distance between the plurality of separated areas, based on the determined thickness of the layer of ice.

29. The method of claim 27, wherein the pulsed heating is applied to a second area of the plurality of separated areas after the pulsed heating is applied to a first area of the plurality of separated areas.

30. The method of claim 26, wherein applying the pulsed heating is performed by applying electromagnetic radiation to the interfacial layer.

31. The method of claim 30, wherein the electromagnetic radiation is emitted from the solid surface into the interfacial layer, wherein a main frequency of the electromagnetic radiation is strongly absorbable in the ice.

32. The method of claim 26, wherein causing the pulsed heating to be applied comprises:
  initially causing a first heating technique to apply the pulsed heating to solid ice at the interfacial layer, producing liquid water; and
  subsequently causing a second heating technique, different than the first heating technique, to apply the pulsed heating to the liquid water in order to substantially vaporize the liquid water.

33. The method of claim 26, further comprising:
  receiving indications of a thickness of the layer of ice at each of one or more locations on the interfacial layer; and
  determining where to apply the pulsed heating based on the indicated thicknesses.

34. The method of claim 33, wherein determining where to apply the pulsed heat comprises:
  determining, based on the received indications, locations where the thickness of the layer of ice is thinner than a predefined threshold thickness; and
  in response to determining that the thickness of the ice layer is thinner than a predefined thickness threshold, refraining from causing the pulsed heating to be applied.

35. The method of claim 33, wherein determining where to apply the pulsed heat comprises:
  determining, based on the received indications, locations where the thickness of the layer of ice is at least a predefined threshold thickness; and
  causing the pulsed heat to be applied to the detected locations on the interfacial layer.

* * * * *